(12) United States Patent
Collmer (10) Patent No.: US 11,312,209 B2
(45) Date of Patent: Apr. 26, 2022

(54) VEHICLE HEATER

(71) Applicant: Eberspächer Climate Control Systems GmbH & Co. KG, Esslingen (DE)

(72) Inventor: Andreas Collmer, Aichwald (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 273 days.

(21) Appl. No.: 16/513,077

(22) Filed: Jul. 16, 2019

(65) Prior Publication Data

US 2020/0023712 A1    Jan. 23, 2020

(30) Foreign Application Priority Data

Jul. 17, 2018    (DE) .................... 10 2018 117 213.3

(51) Int. Cl.
  *B60H 1/22*    (2006.01)
  *F23C 3/00*    (2006.01)
  (Continued)

(52) U.S. Cl.
  CPC .......... *B60H 1/2212* (2013.01); *F23C 3/002* (2013.01); *F23C 9/006* (2013.01); *F23D 5/123* (2013.01);
  (Continued)

(58) Field of Classification Search
  CPC .... B60H 1/2212; B60H 1/2203; B60H 1/032; B60H 1/036; B60H 2001/2271;
  (Continued)

(56) References Cited

U.S. PATENT DOCUMENTS 2,779,398 A * 1/1957 Brown ................. B60H 1/2212
                                                                       431/231
4,590,888 A * 5/1986 Mosig .................... F24H 1/263
                                                                       122/135.3
(Continued)

FOREIGN PATENT DOCUMENTS

DE        3101066 A1 *  2/1982  .......... B60H 1/2203
DE      33 41 490 A1    5/1985
              (Continued)

OTHER PUBLICATIONS

"DE_102011081457_A1_H—Machine Translation.pdf", machine translation, EPO.org, Jun. 14, 2021. (Year: 2021).*

*Primary Examiner* — Steven B McAllister
*Assistant Examiner* — Daniel E. Namay
(74) *Attorney, Agent, or Firm* — McGlew and Tuttle, P.C.

(57) ABSTRACT

A vehicle heater includes a burner area, a circumferential wall providing a combustion chamber, a flame tube with a first end forming or adjacent to a part of the combustion chamber circumferential wall and a second flame tube end. A heat exchanger housing has a circumferential wall enclosing the flame tube. A waste gas backflow space is formed, between an outer side of the flame tube and an inner side of the heat exchanger housing circumferential wall, with an inlet area at the second flame tube end and with an outlet area in the area of the first flame tube end. An inner dimension of the circumferential wall increases in the direction from an inlet area of the waste gas backflow space to an outlet area. An outer dimension of the flame tube increases in the direction from the second flame tube end to the first flame tube end.

13 Claims, 4 Drawing Sheets

(51) Int. Cl.
*F23C 9/00* (2006.01)
*F23D 5/12* (2006.01)
*B60H 1/03* (2006.01)

(52) U.S. Cl.
CPC .......... *B60H 2001/2271* (2013.01); *B60H 2001/2278* (2013.01); *F23D 2900/11403* (2013.01); *F23D 2900/21002* (2013.01)

(58) Field of Classification Search
CPC .......... B60H 2001/2278; F23C 3/002; F23C 2900/03009; F23D 2900/21002; F23D 2206/00
USPC ............................................ 237/12.3 C
See application file for complete search history.

(56) References Cited

U.S. PATENT DOCUMENTS

| | | | | |
|---|---|---|---|---|
| 4,637,371 | A * | 1/1987 | Rathel | B60H 1/2209 122/182.2 |
| 5,056,501 | A * | 10/1991 | Ida | F23D 3/40 126/11 OB |
| 5,456,408 | A * | 10/1995 | Appel | B60H 1/2206 237/12.3 C |
| 6,082,625 | A * | 7/2000 | Faccone | B60H 1/032 237/12.3 C |
| 6,872,073 | B2 * | 3/2005 | Collmer | F23D 11/404 431/261 |
| 9,290,079 | B2 * | 3/2016 | Collmer | F23M 9/10 |
| 9,482,447 | B2 * | 11/2016 | Humburg | B60H 1/2209 |
| 10,113,742 | B2 * | 10/2018 | Dell | F23D 3/40 |
| 10,234,136 | B2 * | 3/2019 | Dell | B60H 1/2203 |
| 10,544,935 | B2 * | 1/2020 | Dell | B60H 1/2203 |
| 11,027,593 | B2 * | 6/2021 | Eberspach | B60H 1/2209 |
| 2004/0197723 | A1 * | 10/2004 | Collmer | F23D 11/404 431/353 |
| 2006/0151623 | A1 * | 7/2006 | Haefner | F24H 3/065 237/12.3 C |
| 2010/0006663 | A1 * | 1/2010 | Linscheidt | F23D 11/345 237/12.3 C |
| 2013/0015255 | A1 * | 1/2013 | Collmer | B60H 1/2212 237/32 |
| 2016/0082811 | A1 * | 3/2016 | Haefner | F24H 8/00 237/12.3 C |
| 2017/0153026 | A1 * | 6/2017 | Dell | F23D 5/123 |
| 2018/0172269 | A1 * | 6/2018 | Dell | F23D 5/123 |
| 2018/0180283 | A1 * | 6/2018 | Dell | B60H 1/2209 |

FOREIGN PATENT DOCUMENTS

| | | | | |
|---|---|---|---|---|
| DE | 19613760 A1 | * | 10/1997 | ............ F24H 3/065 |
| DE | 197 34 814 C1 | | 1/1999 | |
| DE | 199 34 488 A1 | | 2/2001 | |
| DE | 10143479-01 | * | 1/2003 | .......... B60H 1/2209 |
| DE | 20 2004 015 472 U1 | | 12/2004 | |
| DE | 102006056370 A1 | | 5/2008 | |
| DE | 102009046781 A1 | | 5/2011 | |
| DE | 10 2011 081457 A1 | | 2/2013 | |
| GB | 1460220 A | * | 12/1976 | ............ F24H 3/065 |
| GB | 1481752 A | * | 8/1977 | .......... B60H 1/2212 |
| JP | 57118908 A | * | 7/1982 | .......... B60H 1/2206 |
| JP | 02208405 A | * | 8/1990 | |
| JP | 02286421 A | * | 11/1990 | .......... B60H 1/2203 |
| JP | 07223426 A | * | 8/1995 | |
| JP | 11083009 A | * | 3/1999 | |
| JP | 11083194 A | * | 3/1999 | .......... B60H 1/2209 |
| JP | 2002205531 A | * | 7/2002 | |
| RU | 142284 U1 | | 6/2014 | |

* cited by examiner

VEHICLE HEATER

CROSS REFERENCE TO RELATED APPLICATIONS

This application claims the benefit of priority under 35 U.S.C. § 119 of German Application DE 10 2018 117 213.3, filed Jul. 17, 2018, the entire contents of which are incorporated herein by reference.

TECHNICAL FIELD

The present invention pertains to a vehicle heater, comprising a burner area with a combustion chamber enclosed by a combustion chamber circumferential wall, a flame tube with a first flame tube end adjoining the combustion chamber circumferential wall or/and providing at least a part of the combustion chamber circumferential wall and with a second flame tube end open in the direction of a flame tube longitudinal axis for the discharge of combustion waste gas, a heat exchanger housing with a heat exchanger housing circumferential wall enclosing the flame tube on the outside and with a heat exchanger housing bottom located axially opposite the second flame tube end, a waste gas backflow space with an inlet area at the second flame tube end and with an outlet area in the area of the first flame tube end being formed between an outer side of the flame tube and an inner side of the heat exchanger housing circumferential wall, wherein an inner dimension of the heat exchanger housing circumferential wall increases in the direction from the inlet area of the waste gas backflow space to the outlet area of the waste gas backflow space.

TECHNICAL BACKGROUND

Such a vehicle heater is known from DE 20 2004 015 472 U1. The vehicle heater has a flame tube that may be provided as a shaped sheet metal part and the heat exchanger housing is generally a cast metal part. A mold release bevel is generally provided in order to be able to remove the heat exchanger housing. The mold release bevel is produced during the casting process from the casting molds after carrying out the casting process. Due to the provision of this mold release bevel, the heat exchanger housing has, starting from the heat exchanger housing bottom, a radial dimension which increases in relation to the longitudinal axis of the heat exchanger housing, which essentially corresponds to the flame tube longitudinal axis A during assembly, so that a distance of the inner surface of the heat exchanger housing circumferential wall to the flame tube longitudinal axis also increases in a direction away from the heat exchanger housing bottom. This applies both to the distance between the inner side of the heat exchanger housing circumferential wall and the outer side of the flame tube in the area of corresponding apices of the heat transfer ribs and to wall areas of the heat exchanger housing circumferential, which wall areas are formed between every two heat transfer ribs. A distance between the outer side of the flame tube is markedly shorter in the area of the second flame tube end than in a length area of the waste gas backflow space and is located closer to the first flame tube end and to the outlet area.

SUMMARY

An object of the present invention is to provide a vehicle heater that has an improved heat transfer efficiency.

This object is accomplished according to the present invention by a vehicle heater, comprising:
- a burner area with a combustion chamber enclosed by a combustion chamber circumferential wall,
- a flame tube with a first flame tube end adjoining the combustion chamber circumferential wall or/and providing at least a part of the combustion chamber circumferential wall and with a second flame tube end open in the direction of a flame tube longitudinal axis for the discharge of combustion waste gas,
- a heat exchanger housing with a heat exchanger housing circumferential wall enclosing the flame tube on the outside and with a heat exchanger housing bottom located axially opposite the second flame tube end, a waste gas backflow space with an inlet area at the second flame tube end and with an outlet area in the area of the first flame tube end being formed between an outer side of the flame tube and an inner side of the heat exchanger housing circumferential wall, wherein an inner dimension of the heat exchanger housing circumferential wall increases in the direction from the inlet area of the waste gas backflow space to the outlet area of the waste gas backflow space.

Provisions are further made in this case for an outer dimension of the flame tube to increase in the direction from the second flame tube end to the first flame tube end.

Since the flame tube has an increasing outer dimension adapted to the increasing inner dimension of the heat exchanger housing, the combustion waste gas flowing in the waste gas backflow space is forced to a more efficient flow around the heat transfer ribs and around the entire inner side of the heat exchanger housing circumferential wall, so that a reinforced heat transfer interaction between the combustion waste gas and the heat exchanger housing is achieved.

Defined flow conditions may be supported, for example, by the inner dimension of the heat exchanger housing circumferential wall essentially increasing constantly in the length area thereof, which encloses the flame tube, or/and by the outer dimension of the flame tube essentially increasing constantly.

When it is ensured according to an especially advantageous aspect of the present invention that the inner dimension of the heat exchanger housing circumferential wall increases in the length area thereof, which encloses the flame tube, and the outer dimension of the flame tube increases at an essentially equal rate in the direction from the second flame tube end to the first flame tube end, it is possible at the same time to achieve that a distance between the outer side of the flame tube and the inner side of the heat exchanger housing circumferential wall is essentially constant in the direction of the flame tube longitudinal axis.

For an efficient transfer of heat onto the heat exchanger housing, it is proposed that on the inner side of the heat exchanger housing circumferential wall, a plurality of heat transfer ribs, which essentially extend in the direction of the flame tube longitudinal axis and extend radially inwards towards the outer side of the flame tube, each be provided with an apex located opposite the outer side of the flame tube.

To support defined flow conditions for efficient flow around the heat transfer ribs, provisions may be made in this case for the inner dimension of the heat exchanger housing circumferential wall to essentially increase constantly in the length area thereof, which encloses the flame tube, in the area of the apices (apexes) of the heat transfer ribs, wherein provisions are also preferably made here for a radial distance to be essentially constant between the second flame tube end and the first flame tube end between the outer side of the flame tube and the apices of the heat transfer ribs.

For example, for an efficient flow around the heat transfer ribs and yet an existing possibility for a simple assembly, provisions may be made for the radial distance between the outer side of the flame tube and the apices of the heat transfer ribs to be in the range of 0.8 mm to 1.4 mm, preferably in the range of 1 mm to 1.2 mm.

The heat exchanger housing circumferential wall may have an opening angle in the range of 0.5° to 1.5°, preferably about 1°, on its inner side in relation to the flame tube longitudinal axis, and the flame tube may have an opening angle in the range of 0.5° to 1.5°, preferably about 1°, on its outer side in relation to the flame tube longitudinal axis. It should be noted here that such an agreement of the opening angles is especially advantageous for the areas of the inner side of the heat exchanger housing circumferential wall, in which heat transfer ribs are provided, so that such an opening angle may be considered to be at the apex areas of the heat transfer ribs. Equally, such an opening angle or such an agreement of the opening angles may also be provided in the areas of the heat exchanger housing circumferential wall between heat transfer ribs, which are adjacent in the circumferential direction. However, an opening angle, which deviates from the opening angle on the outer side of the flame tube and, for example, increases more sharply or decreases more sharply in the direction away from the heat exchanger housing bottom than on the outer side of the flame tube, may be provided in these areas to influence the flow cross section for the combustion waste gas in the waste gas backflow space.

The heat exchanger housing is preferably a cast metal component for reasons of strength, and the flame tube may be a sheet metal body provided by forming a plate-like (plate shaped) sheet metal blank into an essentially truncated cone-like shape and connecting the sheet metal blank formed into the essentially truncated cone-like shape at longitudinal edge areas located opposite one another for a configuration that is simple to produce.

The present invention will be described in detail below with reference to the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
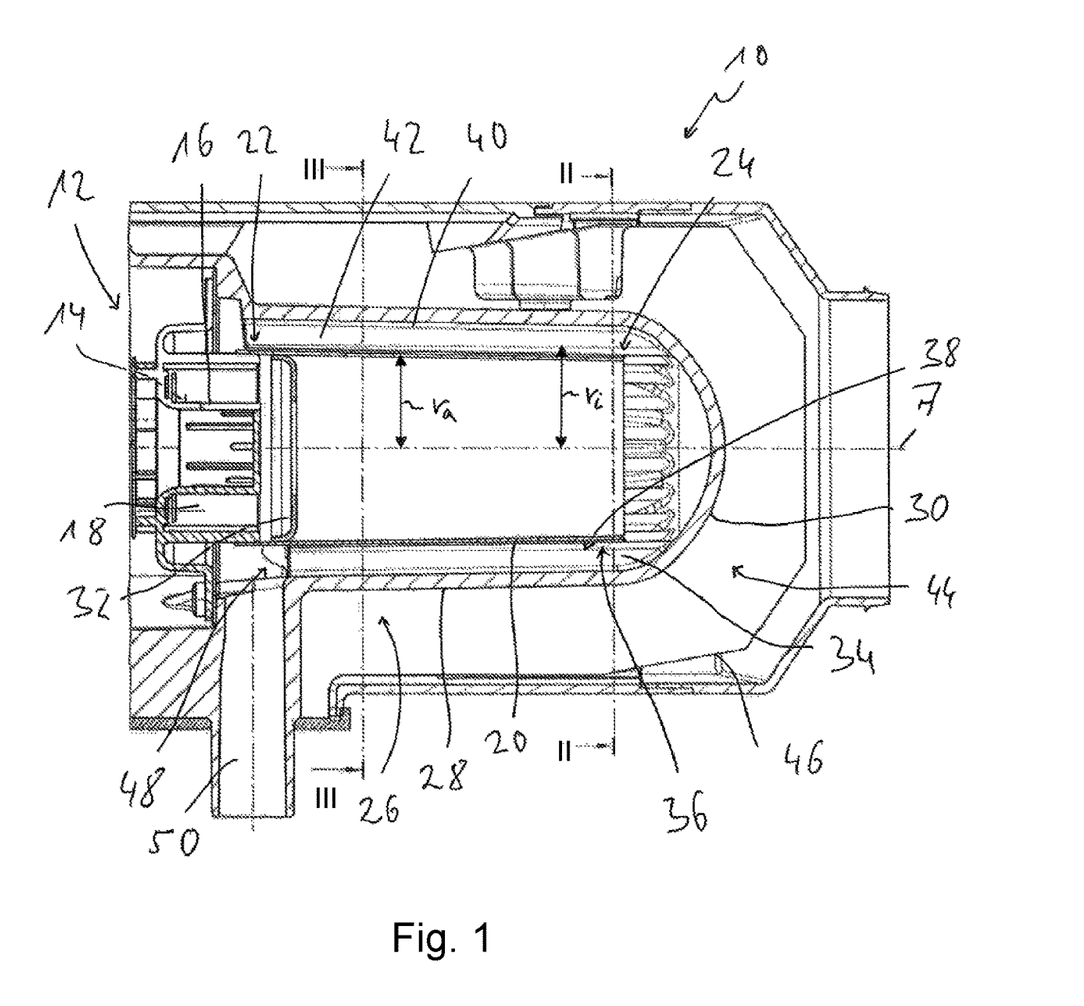
FIG. 1 is a sectional view of a vehicle heater configured according to the principles of the present invention.

Referring to the drawings, a vehicle heater 10 has a burner area (burner configuration) 12 that is fed with fuel and combustion air. A combustion chamber housing 14 of the burner configuration 12 encloses a combustion chamber 18 with a combustion chamber circumferential wall 16. A flame tube 20 adjoins the combustion chamber circumferential wall 16. The flame tube 20 extends, starting from its first flame tube end 22 adjoining the combustion chamber circumferential wall 16, along a flame tube longitudinal axis A and is open in a direction of the flame tube longitudinal axis A at a second flame tube end 24, which is located at a distance from the combustion chamber circumferential wall 16. A heat exchanger housing 26 encloses the flame tube 20 with a heat exchanger housing circumferential wall 28 and is located axially opposite the second flame tube end 24 with a heat exchanger housing bottom 30.

The combustion waste gas flowing out of the combustion chamber 18 along the flame tube 20 through a flame diaphragm 32 carried in the flame tube 20 in the direction of the flame tube longitudinal axis A is discharged from the flame tube 20 at the second flame tube end 24, is deflected radially outwards at the heat exchanger housing bottom 30 and in the area of the inlet area 34 enters a waste gas backflow space 40 formed between an outer side 36 of the flame tube 20 and an inner side 38 of the heat exchanger housing circumferential wall 28. The waste gas, which essentially flows from the inlet area 34 along the outer side 36 of the flame tube 20 in the direction of the flame tube longitudinal axis A, flows around heat transfer ribs 42, which are provided on the inner side 38 of the heat exchanger housing circumferential wall 28 and extend in the direction of the flame tube longitudinal axis A and thereby transfer heat onto the inner side 38 of the heat exchanger housing circumferential wall 28 of the heat exchanger housing 26.

Heat transfer ribs 46, around which air to be heated can flow, are provided on an outer side of the heater exchanger housing 26, so that a large surface is also provided on the outer side 44 of the heat exchanger housing 26 for the transfer of heat.

The waste gas flowing in the waste gas backflow space 40 in the direction towards the first flame tube end 22 leaves the waste gas back flow space 40 at an outlet area 48 formed in the area of the first flame tube end 22 in the direction of a waste gas pipe 50.

The flame tube 20 in the vehicle heater 10 according to the present invention is not provided with a cylindrical configuration in the direction of the flame tube longitudinal axis A, but rather tapers in a conical or truncated cone-like manner (with a truncated cone shape) in the direction of the flame tube longitudinal axis A from a first flame tube end 22 to a second flame tube end 24. With this configuration an inner cross-sectional surface of the flame tube 20, through which combustion waste gas flows, decreases in a direction from the first flame tube end 22 to the second flame tube end 24. Correspondingly, the outer dimension, i.e., for example, the outer radius $r_a$ measured in relation to the flame tube longitudinal axis A, increases starting from the second flame tube end 24 in the direction towards the first flame tube end 22. It should be noted here that, for example, the first flame tube end 22 may be guided over the axial end of the combustion chamber circumferential wall 16 and be fixed thereto, for example, by welding, and thus the flame tube 20 with flame tube length areas located between the combustion chamber circumferential wall 16 and the flame diaphragm 32 may also provide a part of the circumferential wall enclosing the combustion chamber radially on the outside.

Figure 2:
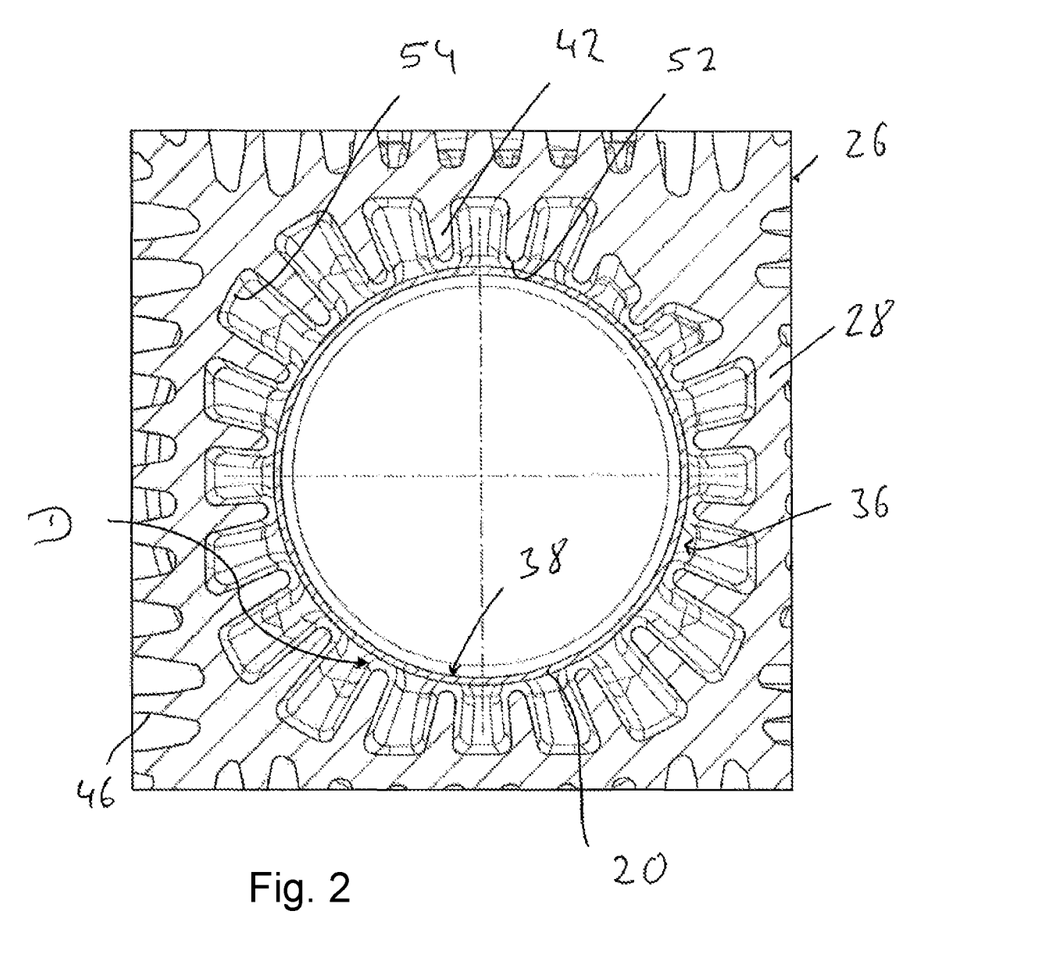
FIG. 2 is a cross-sectional view of the vehicle heater from FIG. 1, cut along a line II-II in FIG. 1.
Figure 3:
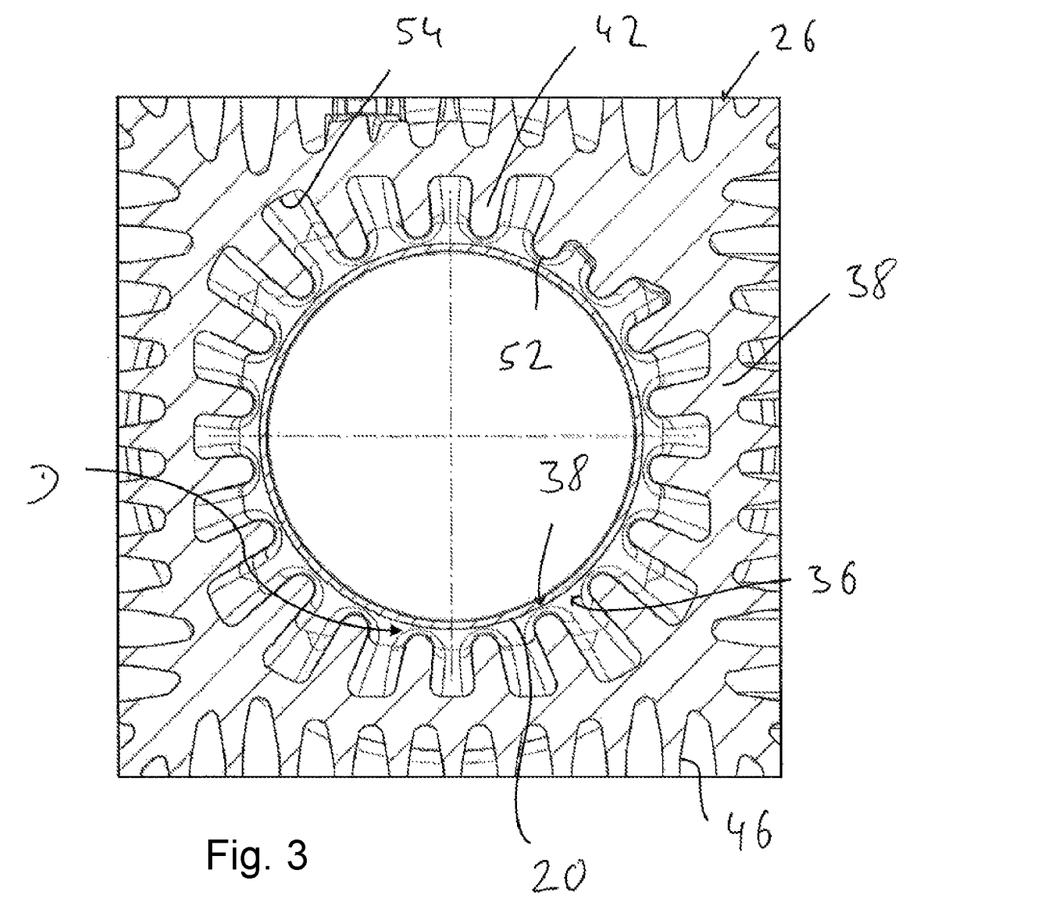
FIG. 3 is a cross-sectional view of the vehicle heater from FIG. 4, cut along a line III-III in FIG. 1.

The change in the outer dimension of the flame tube 20 is selected with regard to the change in the inner dimension of the heat exchanger housing 26 such that this change in the outer dimension of the flame tube 20 is essentially constant in an entire length area of the flame tube 20, which length area is enclosed by the heat exchanger housing circumferential wall 28, between the outer side 36 of the flame tube 20 and the inner side 38 of the heat exchanger housing 26 and of the heat exchanger housing circumferential wall 28, as this is illustrated on the basis of the radial distance D shown in FIGS. 2 and 3. It should be noted at this point that, for example, the inner radius $r_i$, considered in relation to the flame tube longitudinal axis A, can be considered to be an inner dimension of the heat exchanger housing 26 and of the heat exchanger housing circumferential wall 28. The outer radius $r_a$ of the flame tube 20 and the inner radius $r_i$ of the heat exchanger housing circumferential wall 28 in the area of the apices 52 of the heat transfer ribs 42 preferably change essentially constantly in the direction of the flame tube longitudinal axis A and at an equal rate, so that the distance between the apices 52 of the heat transfer ribs 42 and the outer side 36 of the flame tube 20 is also essentially constant and may be, for example, 1 mm to 1.2 mm in the entire length area of the flame tube 20, which entire length area is enclosed by the heat exchanger housing 26. An increase in radial distance between the heat exchanger housing 26 and the flame tube 20, with respect to the direction of the outlet area 48, is avoided with the configuration of the invention. This causes and results in an improved flow of the combustion waste gas flowing in the waste gas backflow space 40 around the heat exchanger housing 26.

Figure 4:
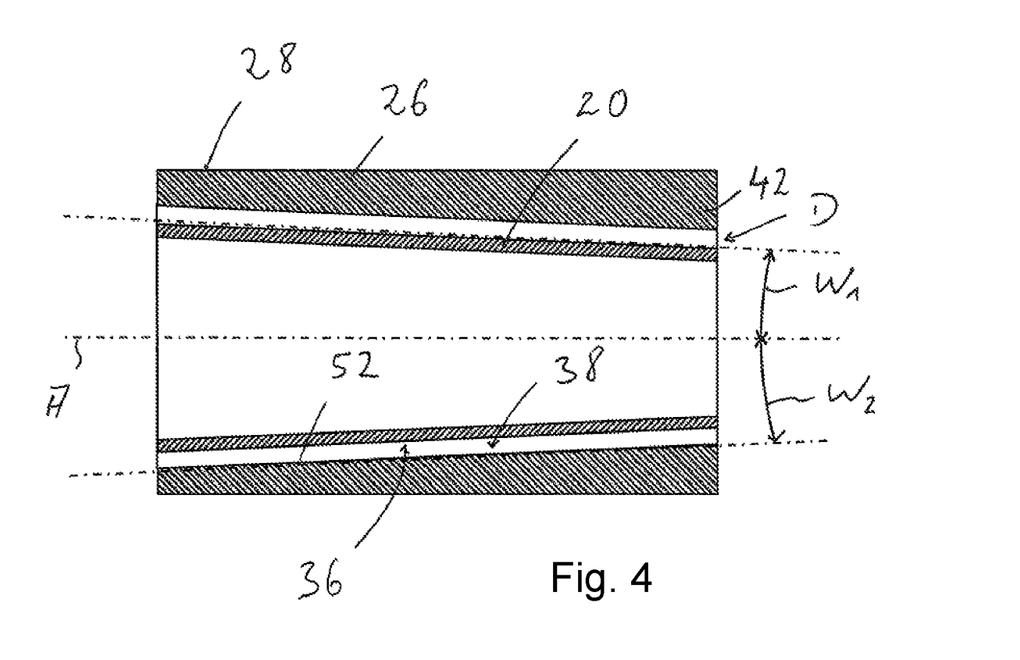
FIG. 4 is a schematic diagram of a longitudinal sectional view of the heat exchanger housing and of the flame tube extending therein for illustrating different opening angles in relation to a flame tube longitudinal axis.

FIG. 4 shows that this avoidance of radial distance increase can be achieved, for example, by an opening angle $W_1$ of the outer side 36 of the flame tube 20 in relation to the flame tube longitudinal axis A and an opening angle $W_2$ of the inner side 38 of the heat exchanger housing circumferential wall 28, for example, measured in the area of the apices 52 of the heat transfer ribs 42, being essentially equal to one another and being about 1°.

It should be noted here that the opening angle $W_2$ may, for example, also be measured at the wall areas 54 of the heat exchanger housing circumferential wall 28, which wall areas 54 are located at a greater distance to the outer side 36 of the flame 20 in relation to the flame tube longitudinal axis A. The heat exchanger housing circumferential wall 28 in these wall areas 54 may be provided with the same opening angle in relation to the flame tube longitudinal axis A, as at the apices 52 of the heat transfer ribs 42, in the entire area axially overlapping the flame tube 20, which in turn means that in this length area, the heat transfer ribs 42 may have an approximately constant projection height in the radially inwards direction. Contrary to such a configuration, however, an opening angle that is different from the opening angle at the apices 52 could be provided in the areas 54, so that the radial distance of the inner side 38 of the heat exchanger housing circumferential wall 28 in the wall areas 54 to the outer side 36 of the flame tube 20 increases from the inlet area 34 to the outlet area 48, for example, when providing an opening angle larger than the opening angle in the area of the apices 52 and of the outer side 36 of the flame 20, and thus, going beyond the flow cross sections, which is increasing anyway due to the provision of an opening angle, a sharper increase in the cross section is present in the waste gas backflow space 40. This means that the surface of the heat exchanger housing 26 provided for the waste gas to flow around increases. In an alternative configuration, the opening angle of the inner side 38 of the heat exchanger housing circumferential wall 28 could be smaller in the wall areas 54 than the opening angle $W_2$ at the apices 52, so that a height of the heat transfer ribs 42 decreases in the flow direction of the combustion waste gas in the waste gas backflow space 40, and a lower increase in the flow cross-sectional surface or possibly a nearly constant flow cross-sectional surface can be provided in the waste gas backflow space 40, as a result of which the temperature of the combustion waste gas, which is decreasing in the flow direction, and the corresponding decrease in volume of same can be compensated.

The vehicle heater 10 can be provided with the configuration shown in FIGS. 1 through 4 in a simple manner by, as already explained above, the heat exchanger housing 26 being provided, for example, as a cast metal component. The flame tube 20 can be provided as a sheet metal body by a flat sheet metal blank being generated with approximately trapezoidal circumferential contour and this is formed or rolled into a truncated cone-like shape, and edge areas of the formed sheet metal blank, which edge areas overlap one another radially or are located opposite one another in the circumferential direction, are then connected to one another by welding. The thus formed sheet metal body can then be pushed with its first flame tube end 22 over the axial end of the combustion chamber circumferential wall 16 and be fixed thereto.

Finally, it should be noted that production-related variations in component dimensions cannot, in principle, be avoided and in this respect it also cannot be ruled out that a deviation or variation of the radial distance between the outer side of the flame tube and the inner side of the heat exchanger housing circumferential wall along the waste gas backflow space occurs in case of a vehicle heater configured according to the present invention. Such a variation in the radial distance or a difference in the opening angle is considered to be negligible in the sense of the present invention, or the radial distance is considered to be essentially constant and the two opening angles are considered to be essentially equal, when a variation or deviation does not exceed a value of about 10%, for example, of the radial distance at the inlet area or of the opening angle of the flame tube.

While specific embodiments of the invention have been shown and described in detail to illustrate the application of the principles of the invention, it will be understood that the invention may be embodied otherwise without departing from such principles.

What is claimed is:

1. A vehicle heater comprising:
   a burner device comprising a combustion chamber circumferential wall circumferentially enclosing a combustion chamber;
   a flame tube with a first flame tube end adjoining the combustion chamber circumferential wall or forming at least a part of the combustion chamber circumferential wall and a second flame tube end open in a direction of a flame tube longitudinal axis for the discharge of combustion waste gas;
   a heat exchanger housing comprising a heat exchanger housing circumferential wall circumferentially enclosing the flame tube on a flame tube outside and a heat exchanger housing bottom located axially opposite the second flame tube end, a waste gas backflow space with an inlet area at the second flame tube end and with an outlet area adjacent to the first flame tube end being formed between an outer side of the flame tube and an inner side of the heat exchanger housing circumferential wall, wherein an inner dimension of the heat exchanger housing circumferential wall increases in a direction from the inlet area of the waste gas backflow space to the outlet area of the waste gas backflow space and an outer dimension of the flame tube increases in a direction from the second flame tube end to the first flame tube end, wherein, on the inner side of the heat exchanger housing circumferential wall, a plurality of heat transfer ribs extending in the direction of the flame tube longitudinal axis and extending radially inwards towards the outer side of the flame tube, are each provided with an apex located opposite the outer side of the flame tube, wherein the inner dimension of the heat exchanger housing circumferential wall increases in a length area thereof, which encloses the flame tube, and the outer dimension of the flame tube increases at an essentially equal rate in the direction from the second flame tube end to the first flame tube end for providing a radial distance between the outer side of the flame tube and the inner side of the heat exchanger housing circumferential wall that is essentially constant in the direction of the flame tube longitudinal axis, such that the radial distance is essentially constant, between the second flame tube end and the first flame tube end, between the outer side of the flame tube and the apices of the heat transfer ribs, and is essentially constant, between the second flame tube end and the first flame tube end, between the outer side of the flame tube and wall areas of the heat exchanger housing circumferential wall located between adjacent heat transfer ribs in a circumferential direction at a greater distance to the outer side of the flame tube than the apices of the heat transfer ribs.

2. The vehicle heater in accordance with claim 1, wherein the inner dimension of the heat exchanger housing circumferential wall essentially increases constantly in a length area thereof, which encloses the flame tube.

3. The vehicle heater in accordance with claim 1, wherein the outer dimension of the flame tube essentially increases constantly.

4. The vehicle heater in accordance with claim 1, wherein the inner dimension of the heat exchanger housing circumferential wall essentially increases constantly in a length area thereof, which encloses the flame tube, in an area of the apices of the heat transfer ribs.

5. The vehicle heater in accordance with claim 1, wherein the radial distance between the outer side of the flame tube and the apices of the heat transfer ribs is in a range of 0.8 mm to 1.4 mm.

6. The vehicle heater in accordance with claim 1, wherein the radial distance between the outer side of the flame tube and the apices of the heat transfer ribs is in a range of 1 mm to 1.2 mm.

7. The vehicle heater in accordance with claim 1, wherein:
the heat exchanger housing circumferential wall has an opening angle in a range of 0.5° to 1.5° of the inner side of the heat exchanger housing circumferential wall in relation to the flame tube longitudinal axis; and
the flame tube has an opening angle in a range of 0.5° to 1.5° of the outer side of the flame tube in relation to the flame tube longitudinal axis.

8. The vehicle heater in accordance with claim 1, wherein:
the heat exchanger housing is a cast metal component; and
the flame tube is a sheet metal body provided by forming a plate-like sheet metal blank into an essentially truncated cone-like shape and connecting the sheet metal blank formed into the essentially truncated cone-like shape at longitudinal edge areas located opposite one another.

9. A vehicle heater comprising:
a burner device comprising a combustion chamber circumferential wall circumferentially enclosing a combustion chamber;
a flame tube comprising a first flame tube end connected to the burner device and a second flame tube end open in a direction of a flame tube longitudinal axis for discharging combustion waste gas, an outer dimension of the flame tube increasing in a direction from the second flame tube end to the first flame tube end at a flame tube increase rate;
a heat exchanger housing comprising a heat exchanger housing circumferential wall circumferentially enclosing the flame tube on a flame tube outside and a heat exchanger housing bottom located axially opposite the second flame tube end, a waste gas backflow space with an inlet area at the second flame tube end and with an outlet area adjacent to the first flame tube end being formed between an outer side of the flame tube and an inner side of the heat exchanger housing circumferential wall, the inner side of the heat exchanger housing circumferential wall having a plurality of heat transfer ribs extending in the direction of the flame tube longitudinal axis and extending radially inwards towards the outer side of the flame tube, each of the heat transfer ribs being provided with an apex located opposite the outer side of the flame tube and the inner side of the heat exchanger housing circumferential wall having a plurality of intermediate wall portions, each of the plurality of intermediate wall portions being located between adjacent heat transfer ribs, an inner dimension of the heat exchanger housing circumferential wall increasing in a direction from the inlet area of the waste gas backflow space to the outlet area of the waste gas backflow space at a housing circumferential wall increase rate that is essentially the same as the flame tube increase rate, wherein,
each respective intermediate wall portion located between adjacent heat transfer ribs is spaced a radial distance from the outer side of the flame tube that is essentially constant from the inlet area of the waste gas backflow space to the outlet area of the waste gas backflow space; and
each respective apex of the heat transfer ribs is spaced a radial distance from the outer side of the flame tube that is essentially constant from the inlet area of the waste gas backflow space to the outlet area of the waste gas backflow space.

10. The vehicle heater in accordance with claim 9, wherein the radial distance between the outer side of the flame tube and the apices of the heat transfer ribs is in a range of 0.8 mm to 1.4 mm.

11. The vehicle heater in accordance with claim 9, wherein the radial distance between the outer side of the flame tube and the apices of the heat transfer ribs is in a range of 1 mm to 1.2 mm.

12. The vehicle heater in accordance with claim 9, wherein:
the heat exchanger housing circumferential wall has an opening angle in a range of 0.5° to 1.5° of the inner side of the heat exchanger housing circumferential wall in relation to the flame tube longitudinal axis;

the flame tube has an opening angle in a range of 0.5° to 1.5° of the outer side of the flame tube in relation to the flame tube longitudinal axis; and the opening angle of the heat exchanger housing circumferential wall is essentially the same as the opening angle of the flame tube.

13. The vehicle heater in accordance with claim 9, wherein:

the heat exchanger housing is a cast metal component; and the flame tube is a sheet metal body provided by forming a sheet metal blank into an essentially truncated cone-like shape and connecting the sheet metal blank formed into the essentially truncated cone-like shape at longitudinal edge areas located opposite one another.

* * * * *